March 3, 1953  N. S. BEEBE ET AL  2,630,355
MOTOR DRIVE MOUNTING BEARING BRACKET
Filed June 26, 1950
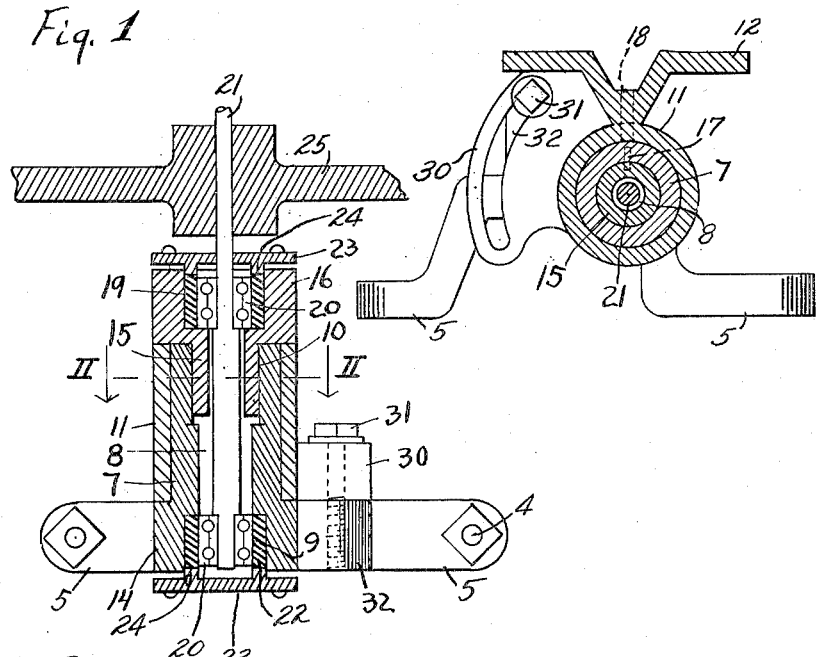
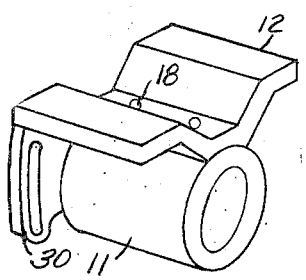
Inventors
Nathan S. Beebe
Joseph D. Stanard
K. M. Thorpe
Attorney Patented Mar. 3, 1953

2,630,355

UNITED STATES PATENT OFFICE 2,630,355

MOTOR DRIVE MOUNTING BEARING BRACKET

Nathan S. Beebe and Joseph D. Stanard, Kansas City, Mo.

Application June 26, 1950, Serial No. 170,334

4 Claims. (Cl. 308—184)

This invention relates to self-aligning shock-absorbing motor supports and power take-off shafts, and has for one of its objects to produce a bearing mount which is adapted for wide use and installation without the necessity of extensive close tolerance machine operations. The construction of the bearing includes a bushing of compressible material, such as rubber, enclosed in an assembly whereby the bushing can be expanded within a cup to compress same against an anti-friction bearing assembly of any type to hold the bearing race against rotation but leave enough resiliency so that the shaft can center itself.

Another object of the invention is to provide as a unitary structure a device of the character described which is compact, shock-proof, quiet, strong, durable and efficient in service.

A further object of the invention is the adaptation of the bearing mount to a motor support and power take-off assembly which is particularly adapted for use with the type-setting machines.

With the general objects named in view and others as will hereinafter appear, the invention consists in certain new and useful features of construction and organization of parts as hereinafter described and claimed; and in order that it may be fully understood, reference is to be had to the accompanying drawings, in which—

Figure 1 is an enlarged horizontal section through the bearing support.

Figure 2 is a section on the line III—III of Figure 1.

Figure 3 is a perspective view of the rocking bearing support and motor platform carried thereby.

In the drawings, where like reference characters identify corresponding parts in all of the figures, support arms 5 form integral parts of a cylindrical bearing housing 7 formed with a tubular extension 8 counterbored at its ends as at 9 and 10 respectively. The exterior of the housing 7 is turned to provide a bearing for a motor mount casting 11 formed with a platform 12 to support an electric motor or the like, not shown. The casting 11 is held in position by an abutment head 14 at one end of housing 7.

Extended into the counterbore 10 is a tubular stem 15 of a cup member 16 which provides an abutment shoulder complementary to shoulder 14 for holding casting 11 in position. Cup 16 is held in position by securing screws 17 engaging extension 8. Screws 17 are accessible through access opening 18 in the motor mount.

The outer end of the cup 16 is also counter-bored as at 19. Fitted within the counterbores 9 and 19 are suitable ball or other bearings 20 supporting a drive shaft 21. The bearings are shock mounted and self-aligning by being mounted within rubber bushings 22, which are expanded by means of cap members 23 provided with internal pressure flanges 24.

The shaft 21 constitutes a power take-off shaft and may be driven by a belt encircling pulley 25, from a motor, not shown, carried by the platform 12. Power take-off shaft 21 may, of course, be provided with other pulleys, gears or the like, now shown for driving purposes. In order that the motor may be secured in angular relation if desired, the casting 11 is formed with a web 30 having a curved slot receiving a clamp bolt 31 threaded into an ear 32 of the casting 7. With this arrangement the motor may be locked in the desired relation.

From the above description and drawings it will be apparent that we have produced a construction embodying all of the features of advantage set forth as desirable; and while we have described and illustrated the preferred construction, it is to be understood that we reserve the right to make all changes within the spirit and scope of the appended claims.

We claim:

1. In an adjustable motor driving support, the combination of a housing having a base formed with a tubular extension, one end of said extension having an internal bearing insert and an external abutment head, a tubular sleeve telescoped into the extension and having one end internally formed with a bearing insert and externally provided with an abutment head complementary to the first head, a motor support rockingly mounted on the extension between said abutments, and means to secure the support in fixed relation to the housing.

2. In an adjustable motor driving support, the combination of a housing having a base formed with a tubular extension, one end of said extension having an internal bearing insert and an external abutment head, a tubular sleeve telescoped into the extension and having one end internally formed with a bearing insert and externally provided with an abutment head complementary to the first abutment head, a shaft journaled in said bearing inserts, cap members for holding the bearing inserts in position, a motor support rockingly journaled on the extension between said abutments, and means to secure the support in fixed relation to the housing.

3. In an adjustable motor driving support, the combination of a housing having a base formed with a tubular extension, one end of said extension having an internal bearing insert and an external head, a tubular sleeve telescoped into the extension and having one end formed with a bearing insert and externally provided with an abutment head complementary to the first abutment head, a shaft journaled in said bearing inserts, cap members for closing the outer ends of the bearing seats, a motor support rockingly journaled on the extension between said abutments, means to secure the support in fixed relation on the housing, said motor support having an access opening to the extension member, and means passed through the access opening for securing the sleeve within the extension.

4. In an adjustable motor driving support, the combination of a housing having a base formed with a tubular extension, one end of said extension having an internal bearing seat and an external abutment head, a tubular sleeve telescoped into the extension and having one end formed with a bearing seat and externally provided with an abutment head complementary to the first abutment head, rubber shock mounts within the seats, bearings carried by the shock mounts, a shaft journaled in said bearings, cap members for expanding the shock mounts, and locking means for securing the sleeve within the extension.

NATHAN S. BEEBE.
JOSEPH D. STANARD.

REFERENCES CITED

The following references are of record in the file of this patent:

UNITED STATES PATENTS

| Number | Name | Date |
|---|---|---|
| 1,166,979 | Gaillet | Jan. 4, 1916 |
| 1,249,308 | Borger et al. | Dec. 11, 1917 |
| 1,680,843 | Bechaud | Aug. 14, 1928 |
| 2,532,327 | Parks | Dec. 5, 1950 |

FOREIGN PATENTS

| Number | Country | Date |
|---|---|---|
| 261,252 | Great Britain | Nov. 18, 1926 |
| 712,677 | France | Oct. 7, 1931 |